United States Patent [19]

Krohn et al.

[11] 3,997,249

[45] Dec. 14, 1976

[54] ION EXCHANGEABLE SEGMENT GLASS

[75] Inventors: David A. Krohn; Robert E. Graf, both of Southbridge, Mass.; Emil W. Deeg, Woodstock, Conn.

[73] Assignee: American Optical Corporation, Southbridge, Mass.

[22] Filed: Oct. 28, 1975

[21] Appl. No.: 625,963

[52] U.S. Cl. .............................. 351/166; 65/30 E; 351/168; 351/171; 106/52; 106/47 Q; 428/410

[51] Int. Cl.² .......................................... G02B 5/28

[58] Field of Search ........... 106/52, 47 Q; 65/30 E; 427/165, 169; 428/410; 351/166

[56] References Cited

UNITED STATES PATENTS

| | | | |
|---|---|---|---|
| 3,533,888 | 10/1970 | Eppler et al. | 351/166 |
| 3,790,260 | 2/1974 | Boyd et al. | 351/166 |
| 3,898,093 | 8/1975 | Faulstich et al. | 106/54 |
| 3,899,315 | 8/1975 | Siegmund | 65/31 |
| 3,923,486 | 12/1975 | Kitano et al. | 65/30 E |

*Primary Examiner*—Helen M. McCarthy
*Attorney, Agent, or Firm*—H. R. Berkenstock, Jr.; William C. Nealon

[57] ABSTRACT

There is disclosed an ion exchange-strengthened ophthalmic segment glass suitable for the fabrication of fused bifocal and trifocal ophthalmic lenses. More particularly, there is disclosed a lanthanum-silicate based ophthalmic segment glass having indices of refraction of about 1.57 to about 1.65 which is suitable for chemical ion exchange strengthening so as to develop a compressively-stressed ion-exchanged surface layer having a depth of at least 60 micrometers.

4 Claims, No Drawings

ION EXCHANGEABLE SEGMENT GLASS

BACKGROUND OF THE INVENTION

1. Field of the Invention:

This invention relates to ophthalmic segment glasses useful in the fabrication of fused bifocal and trifocal lenses.

2. Description of the Prior Art:

High index ophthalmic segment glasses generally have been fabricated from barium silicates, lead silicates and barium lead silicates. Conventional ophthalmic segment glasses when incorporated into fused multifocal lenses are not significantly strengthened by a chemical ion exchange process. Therefore, when a fused multifocal lens is subjected to a chemical ion exchange process in order to strengthen said lens, the base crown glass to which the segment glass is fused is suitably strengthened while the fused portion of the multifocal lens remains weak. Impact on the segment portion of the lens can result in breakage of the multifocal lens.

In U.S. Pat. No. 3,294,560, there is disclosed a barium-lead-silicate segment glass having a bronze-smoke color. There is no indication that the segment can be strengthened by ion exchange or otherwise. Flint glasses (high index) are not recommended for ion exchange (Chemtempering Today, Corning Glass Works (1974) page 7).

SUMMARY OF THE INVENTION

A segment glass suitable for use in the preparation of fused multifocal ophthalmic lenses is disclosed which can be strengthened by a chemical ion exchange process. The segment glasses of the invention comprise a lanthanum silicate glass in which the required high index of refraction is obtained by the use of lanthanum in the proportions by weight of about 15 to about 35 percent, preferably about 20 to about 35 percent.

DESCRIPTION OF THE PREFERRED EMBODIMENTS

The segment glasses of the present invention can be described by the compositional ranges presented below:

| Component | Percent by Weight |
|---|---|
| $SiO_2$ | about 30 to about 60 |
| $K_2O$ | about 8 to about 12 |
| $Na_2O$ | about 7 to about 10 |
| $La_2O_3$ | about 15 to about 35 |
| BaO | up to about 5 |
| $TiO_2$ | up to about 10 |
| $Ta_2O_5$ | up to about 10 |
| $WO_3$ | up to about 5 |
| ZnO | up to about 10 |
| Fining Agents $As_2O_3$ $Sb_2O_3$ | up to about 2 |

The glasses disclosed in this invention were made in platinum crucibles using standard glass-making techniques. The raw materials consisted of high purity silica, nitrates and carbonates of sodium and potassium, oxides of zinc, titanium, lanthanum, tantalum, and tungsten, and small portions of antimony and arsenic oxides which were thoroughly mixed prior to melting. A platinum crucible with a 0.5 liter capacity was preheated at 1425° C in an electric furnace. The batch was transferred to the crucible in 300 to 400 gram portions. After the crucible was sufficiently full, the furnace was held at 1425° C for about 18 hours. The furnace temperature was reduced to 1260° C and the melt was stirred for 3 hours. The melt was cast at 1230° C into a plate. The glass plate was transferred to an oven and held in the annealing range about 1 hour and then cooled at a rate of 15°–50° C/hour until the glass was at room temperature.

Specimens of the glass (2.5 cm × 2.5 cm × 5 mm) were ion exchanged in a salt bath of $KNO_3$ for either 6 hours at 510° c or 16 hours at 454° C. The photoelastic characterization of the ion exchange properties was accomplished using a polarizing microscope with a quartz wedge compensator for stress determination. The depth of the compressive layer (neutral zone) was found using the Friedel technique with a polarizing microscope and a filar eyepiece.

Conventional methods of fabricating fused multifocal ophthalmic lenses can be used to fuse the chemical ion exchangeable segment glasses of the invention to an ophthalmic crown glass. Preferably, an ophthalmic crown base glass is utilized which can also be strengthened by means of a process of chemical ion exchange. This allows the strengthening of the base ophthalmic crown glass together with the fused segment glass by conducting a single chemical ion exchange process. Conventional methods of fabricating fused multifocal lenses entail grinding and polishing the fused segment glass so as to present a smooth curved surface on one side thereof. The base ophthalmic crown glass blank is finished with a ground and polished recessed portion on its convex side conforming to the ground and polished surface of the segment glass. The segment glass according to conventional methods can be formed of a composite button prepared by fusing a small segment of the base crown glass to a segment glass such as the segment glass of the invention. To complete the process, the button and the base crown glass blank are then brought together and heated to a temperature sufficient to fust them together. A method of fabricating a bifocal lens is disclosed in U.S. Pat. No. 2,112,659.

For satisfactory results in preparing a fused multifocal lens, it is desirable that the thermal expansion properties of the glasses employed be similar so as to prevent stresses being created in the finished composite lenses and, in addition, it is preferred that the segment glass have a softening point somewhat lower than that of the crown glass to which it is fused.

The following examples illustrate the various aspects of the invention but are not intended to limit it. Where not otherwise specified throughout the specification and claims, temperatures are given in degrees centigrade and parts are by weight.

EXAMPLE 1

Utilizing the conventional glass-making techniques described above, specimens of glass suitable for use in preparing fused multifocal segment glasses were prepared having the following ingredients by weight on the oxide basis:

| | |
|---|---|
| silicon dioxide | 50.5 percent |
| potassium oxide | 10 percent |
| sodium oxide | 9 percent |
| lanthanum oxide | 30 percent |

-continued

| | |
|---|---|
| arsenic oxide | 0.25 percent |
| antimony oxide | 0.25 percent |

The properties of the glass were found to be as follows:

| | |
|---|---|
| refractive index | 1.57 |
| strain point | 522° C |
| softening point | 733° C |
| coefficient of expansion | 110 × 10$^{-7}$/° C |

Samples of the glass of Example 1 measuring 2.5 cm × 2.5 cm × 5 mm were subjected to a chemical ion exchange treatment in a bath of potassium nitrate at a temperature of 454° C for a period of 16 hours to provide a glass having a compressive strength of 26,900 pounds per square inch and a neutral layer depth of 106 micrometers.

EXAMPLE 2

Using conventional glass-making procedures as described above, a glass suitable as a segment glass for the preparation of fused multifocal ophthmic lenses was prepared by combining glass-making ingredients to provide a glass having a composition by weight on the oxide basis as follows:

| | |
|---|---|
| silicon dioxide | 38 percent |
| potassium oxide | 10 percent |
| sodium oxide | 9 percent |
| titanium dioxide | 7.5 percent |
| lanthanum oxide | 30 percent |
| tantalum oxide | 5 percent |
| fining agents consisting of arsenic oxide and antimony oxide | 0.25 percent of each |

The properties of this glass were found to be as follows:

| | |
|---|---|
| refractive index | 1.64 |
| strain point | 550° C |
| softening point | 709° C |
| coefficient of expansion | 117 × 10$^{-7}$/° C |

Chemical ion exchange of a sample of the glass of Example 2 measuring 2.5 cm × 2.5 cm × 5 mm was conducted at a temperature of 510° C for a period of 6 hours. A compressive strength in pounds per square inch of 24,500 was obtained and the depth of the neutral zone was found to be 85 micrometers.

EXAMPLE 3

Using the conventional glass-making procedures described above, a glass suitable for use in the preparation of fused multifocal ophthalmic lenses was prepared by combining glassmaking raw materials to obtain a glass having the following composition by weight on the oxide basis:

| | |
|---|---|
| silicon dioxide | 40 percent |
| potassium oxide | 10 percent |

-continued

| | |
|---|---|
| sodium oxide | 9 percent |
| barium oxide | 5 percent |
| lanthanum oxide | 30 percent |
| zinc oxide | 5.5 percent |
| fining agents consisting of arsenic oxide and antimony oxide | 0.25 percent each |

The properties of the glass of Example 3 were as follows:

| | |
|---|---|
| refractive index | 1.60 |
| softening point | 688° C |
| strain point | 488° C |
| coefficient of expansion | 123 × 10$^{-7}$/° C |

The glass of Example 3 was exposed to a chemical ion exchange treatment at a temperature of 510° c for a period of 6 hours. The glass measured 2.5 cm × 2.5 cm × 5 mm. A salt bath of potassium nitrate was used. A compressive strength of 13,300 pounds per square inch was obtained and the depth of compressive layer (neutral zone) was found to be 93 micrometers.

EXAMPLES 4–6

Each of the glasses of Examples 1–3, after the composition is adjusted by increasing or decreasing the alkali level to achieve the proper fusion strain, are fabricated into a bifocal lens in accordance with conventional methods utilizing an ion-exchangeable base glass having the following properties:

| | |
|---|---|
| refractive index | 1.523 |
| softening point | 731° C |
| strain point | 500° C |
| coefficient of expansion | 103 × 10$^{-6}$/° C |

A chemical ion exchange treatment is conducted on the fused bifocal lenses at be temperature of 510° c using a potassium nitrate salt bath. Strengthened bifocal lenses are obtained.

While this invention has been described with reference to certain specific embodiments, it will re recognized by those skilled in the art that many variations are possible without departing from the scope and spirit of the invention.

We claim:

1. A chemically ion exchange-strengthened lanthanum-silicate based ophthalmic segment glass having a compressively-stressed, ion-exchanged surface zone that is at least 60 micrometers in depth, said glass being formed of a lanthanum-silicate glass consisting essentially of alkali metal oxides selected from the group consisting of (1) mixtures of sodium and potassium oxides and (2) mixtures of the oxides of sodium and potassium and other alkali metal oxides wherein said alkali metal oxides are present in the proportions by weight:

| | |
|---|---|
| sodium oxide | about 7 to about 10 percent |
| potassium oxide | about 8 to about 12 percent |
| other alkali | |

| | |
|---|---|
| -continued | |
| metal oxides | up to 5 percent | provided the proportion of total alkali metal oxides present is up to 20 percent, in combination with about 15 to about 35 percent lanthanum oxide; the balance of said glass being essentially about 30 to about 60 percent silica.

2. An ion exchange-strengthened ophthalmic segment glass in accordance with claim 1 wherein said glass comprises by weight about 20 to about 35 percent lanthanum oxide.

3. An ion exchange-strengthened lanthanum-silicate based ophthalmic segment glass according to claim 2 wherein said glass comprises by weight 10 percent potassium oxide, 9 percent sodium oxide, 7.5 percent titanium oxide, 5 percent tantalum oxide and 30 percent lanthanum oxide.

4. An ion exchange-strengthened ophthalmic segment glass according to claim 2 wherein said glass comprises by weight 10 percent potassium oxide, 9 percent sodium oxide, 30 percent lanthanum oxide and the balance silicon dioxide.

* * * * *